United States Patent Office 2,960,407
Patented Nov. 15, 1960

2,960,407
DIETHYLSTILBESTROL COMPOSITIONS

Francis X. Gassner, Fort Collins, Colo., and William N. McLellan, Santa Maria, Calif., assignors to Olin Mathieson Chemical Corporation, a corporation of Virginia No Drawing. Filed May 14, 1958, Ser. No. 735,119

18 Claims. (Cl. 99—2)

The present invention relates to the improvement of meat production in meat producing animals. More specifically the invention relates to improved diethylstilbestrol compositions and methods in this art and particularly for finishing meat producing cattle.

The addition of small amounts of diethylstilbestrol to rations for feed-lot cattle for the purpose of enhancing growth and fattening has become a more or less common procedure in the cattle feeding industry during the past year. While the overall results obtained have for the most part been satisfactory, the compositions and methods employed have been subject to certain disadvantages noted below.

The commercially available diethylstilbestrol premix employs oilmeals of either soybean, linseed or cottonseed as the carrier. This concentrate premix, containing from 0.5 to 1.0 gram of diethylstilbestrol per pound, is supplied to feed manufacturers who in turn mix it with sufficient unfortified oilmeal so that the final concentration of diethylstilbestrol will be 10 mg. per 1 lb. or 2 lbs. of meal. It is sold in this form to the cattle feeder who mixes either of these quantities with the final ration in such a manner that each animal does not receive more than 10 mg. of diethylstilbestrol per day.

This procedure has been found objectionable particularly to the feed manufacturers primarily for two reasons: (1) due to the weight and bulk of the concentrate premix, and (2) due to difficulties encountered in mixing the oilmeal concentrate premix with the unfortified oilmeal to obtain a 1 or 2 lb. mix containing 10 mg. of diethylstilbestrol to be supplied to the feeders. As for the former, for example, in order to feed 1000 steers for 100 days at 10 mg. of diethylstilbestrol per day, requires 100,000 animal dosages or 1000 gm. of diethylstilbestrol. The feed mill must thus obtain 1000×1 lb. or 2 lbs. of premix depending upon whether the feedlot uses 1 lb. or 2 lbs. of oilmeal concentrate in the final feed carrying 10 mg. of diethylstilbestrol per animal. This requires the handling of one-half ton or one ton, respectively, of premix, and entails relatively high freight charges and storage overhead which are carried by the feed mill. Various suggestions have been made to overcome this disadvantage but have not proven practical primarily because of increased mixing difficulties encountered in obtaining products having the prescribed amount of diethylstilbestrol.

In extensive investigations it was discovered that the addition of 0.5 to 1.0 lb. of emulsified animal or vegetable fats or fatty oils to a daily ration per steer improved palatability and increased gain in weight. With further investigations it was also discovered that diethylstilbestrol could be safely and accurately incorporated in the emulsified fat as well as in molasses and the like, provided the diethylstilbestrol was dissolved in a liquid polyethylene glycol-acidulated fatty oil solution and that the resulting emulsions could be readily applied by spraying directly to the oilmeal or other like feed. The diethylstilbestrol-polyethylene concentrate premix employed in the present invention, instead of involving the handling and storage of 0.5–1.0 ton of premix per 1000 gm. of diethylstilbestrol as found necessary heretofore, proved to involve only the handling and storage of about 6 lbs. of premix per 1000 gm. of diethylstilbestrol. This is accomplished without increasing mixing problems, and the savings in freight charges and storage to the feed mill are obvious. It also entails the ultimate obtainable in safety to the operators or feed processors, e.g. there are no dust problems and the wearing of masks and rubber gloves required heretofore by law becomes unnecessary.

The following examples will serve to illustrate the invention.

EXAMPLE I
General method

Diethylstilbestrol is first dissolved in liquid polyethylene glycol, preferably with warming and stirring to insure a homogeneous mixture or solution. The polyethylene glycol should be of the liquid type, e.g. polyethylene glycols with molecular weights of 200, 400 and the like, as distinguished from solid high molecular weight types of polyethylene glycols available under the name "Carbowax." See McClelland et al., Chem. Eng. News 23, No. 3, page 247 (1945). The polyethylene glycol mixture should contain at least about 30 percent by weight of diethylstilbestrol and can contain up to about 70 percent by weight of diethylstilbestrol. A preferred composition made up of polyethylene glycol 200 contains about equal amounts by weight of diethylstilbestrol and polyethylene glycol. This is the concentrate premix sold to the feed manufacturer. It is in the form of a semi-solid paste at room temperature and can be put in tin-lined cans. Investigations have shown it to be stable on storage, e.g., free from molding, bacterial contamination, etc., and to be free from separation.

The diethylstilbestrol-polyethylene glycol mixture obtained as above is liquefied by warming and then mixed with liquid acidulated fatty oil of either the animal or vegetable variety containing about 1–5 percent free fatty acids. Acidulated coconut oil available commercially as coconut oil foots and containing about 1–3 percent by weight of free fatty acids has proven to be the ideal vehicle and to be preferred. This polyethylene glycol-diethylstilbestrol-acidulated fatty oil intermediate can be in a ratio of about one kilogram of polyethylene glycol-diethylstilbestrol to 20–100 liters of acidulated fatty oil. A preferred composition contains about one kilogram of polyethylene glycol-diethylstilbestrol to about 25–45 liters of acidulated fatty oil with sufficient diethylstilbestrol to provide a solution containing about 10–15 grams of diethylstilbestrol per liter. Investigations have shown that presence of free fatty acids such as found in fatty oil foots to be essential to maintain solution stability, i.e. freedom from crystallization, separation, etc. of this composition at room temperature and below.

The polyethylene glycol-diethylstilbestrol-acidulated fatty oil composition can be used in various ways, one of which is to emulsify in fats or fatty oils including a mixture of crude animal and vegetable fats or fatty oils. One of the preferred compositions contains about 25 grams of diethylstilbestrol in about 1100–1500 pounds of fat.

For emulsification the diethylstilbestrol-polyethylene glycol-acidulated fatty oil composition is vigorously agitated with dilute aqueous sodium hydroxide and fat, the water-fat ratio being about 2–3:1 with about 1–2 percent caustic soda based on the weight of the fat. This emulsion is then sprayed on oilmeal, various grains (e.g. ground corn), dried beet pulp, alfalfa, or the like with mixing to provide a 1 or 2 lb. product containing 10 mg. of diethylstilbestrol.

EXAMPLE II

Specific method—Step 1

|  | Gm. |
|---|---|
| Crystalline diethylstilbestrol | 2,500 |
| Polyethylene glycol (200) | 2,500 |

The diethylstilbestrol is dissolved in the liquid polyethylene glycol by heating the mixture to 85° C. with stirring. This mixture on cooling to room temperature forms a stable semi-solid white paste. This is the form in which it is shipped to the feed manufacturers.

Step 2

The paste obtained in Step 1 is liquefied by heating to 85° C. and is then poured with agitation into 192.3 liters of acidulated coconut oil containing about 2 percent free fatty acid and heated to about 50° C.

Step 3

Two liters of the diethylstilbestrol-polyethylene glycol-oil composition prepared as in Step 2 is then thoroughly mixed by agitation with 1300 lbs. of hot fats heated at about 50° C.

Step 4

The composition prepared as in Step 3 is then added to mixture made up of about 420 gallons of water and 6 gallons of 20 percent sodium hydroxide and the resulting mixture emulsified with vigorous agitation. The composition produced as above contains about 52 grams of the original diethylstilbestrol-polyethylene composition or 26 grams of diethylstilbestrol. The water-fat ratio is about 2.5:1 with about 1.5 percent caustic soda based on the fat.

The composition prepared as above containing about 1300 lbs. of fat and 26 g. of diethylstilbestrol is then power sprayed with mixing on 20 tons of oilmeal or other feed. This provides a daily ration of 0.5 lb. of fat and 10 mg. of diethylstilbestrol for 2600 steers and can be mixed with the final ration in accordance with standard practices in the art. The process is relatively simple and safe to the operators and analyses have shown the product to be homogeneous and proper dosage easily controlled.

The polyethylene glycol-diethylstilbestrol-acidulated fatty oil composition prepared as in Step 2 above, can be advantageously used in other ways besides in emulsion form as described in Steps 3–4. For example, the acidulated fatty oil composition can be merely mixed with various diluents such as vegetable oils including rice bran oil, soybean oil, corn oil, etc. as well as animal oils or mixtures of the same including crude oil foots, fatty by-products, etc. or be emulsified in beet or cane molasses, and be sprayed on cattle rations of various types used in the finishing of meat producing cattle.

A preferred way of using the diethylstilbestrol-polyethylene glycol mixture with molasses is as follows.

EXAMPLE III

Step 1

A paste made up of equal parts by weight of diethylstilbestrol and liquid polyethylene glycol (200) prepared as in Step 1 of Example II, is first liquefied by heating to about 85° C. and then mixed with stirring with sufficient hot (e.g. 50° C.) acidulated coconut oil foots containing about 2 percent free acid to provide a solution containing 10 mg. of diethylstilbestrol per cc. With 5000 gm. of paste containing 2500 gm. of diethylstilbestrol, sufficient oil foots is added to bring the volume up to 250 liters.

Step 2

One part of the acidulated oil solution prepared in Step 1 is next mixed with agitation with four parts of water containing about 3 percent caustic soda based on the weight of acidulated oil. With 250 liters of oil solution 1000 liters of dilute aqueous sodium hydroxide is required. The resulting emulsion contains 2 mg. of diethylstilbestrol per cc.

Step 3

The emulsion prepared in Step 2 is then mixed with sufficient 50 percent water-50 percent sugar beet molasses solution to provide each pound of product with 50 cc. of the emulsion of Step 2. The resulting mixture in emulsion form contains 100 mg. of diethylstilbestrol per pound.

Step 4

Six pounds of the emulsion prepared in Step 3 is then mixed with 54 pounds of sugar beet molasses. This gives 60 pounds of final product containing 600 mg. of diethylstilbestrol. It is in the form of a stable, homogeneous emulsion and is fed at the rate of one pound per animal to provide 10 mg. of diethylstilbestrol per day as described above.

Investigations have shown the used of liquid polyethylene glycol, which is completely water-soluble, as distinguished from the solid higher molecular weight (polyethylene glycols 1000 and above) Carbowax-type polyethylene glycols, which are only of limited water solubility (see McClelland et al., supra), to be critical and essential in the present invention. Government regulations, for example, require that the dosage of diethylstilbestrol in this field be strictly controlled and not exceed a daily dose of 10 mg. In view of this, it is essential that the diethylstilbestrol form a homogeneous dispersion or mixture with the polyethylene glycols and that the resulting dispersion remain homogeneous, i.e. remain stable without separation of the ingredients on cooling and in storage. The liquid polyethylene glycols uniquely provide for this as they have been found to form homogeneous, extremely stable pastes when mixed with 30–70 percent diethylstilbestrol. The higher molecular weight Carbowax-type polyethylene glycols which are solid including soft waxy-like in character at room temperature, have proven unsatisfactory for this purpose either because they do not form homogeneous mixtures with diethylstilbestrol or, if homogeneous mixtures are formed initially (e.g. on heating to liquefy the polyethylene glycol), the resulting mixtures become heterogeneous and take on a powdery or crystalline character on cooling. Aside from the fact that their heterogeneous character makes controlled dosage for practical purposes impossible, the resulting powdered preparations are objectional due to dust problems with resulting danger (e.g. due to inhalation of hormone active dust) to the operators. This is all avoided by the use of the stable pastes of the present invention.

For controlled dosage it is also essential that the polyethylene glycol-diethylstilbestrol mixture form stable, homogeneous mixtures, solutions or emulsions in the acidulated oil and aqueous mixtures made therefrom. The liquid polyethylene glycols which are completely water-soluble, e.g. at 20° C., have also been found to uniquely provide for this. The solid Carbowax-type of polyethylene glycols on the other hand, are only of limited water solubility and their use has proven completely unsatisfactory due to their failure to form stable mixtures, solutions and emulsions with diethylstilbestrol. When solid Carbowax-type polyethylene glycols, for example, are substituted for the water-soluble liquid polyethylene glycols the diethylstilbestrol settles out of the mixtures, solutions and emulsions on cooling. To obtain and retain the desired physical state of dispersion, the use of polyethylene glycols which are both liquid and completely water-soluble at room temperature is essential in the present invention.

The present application is a continuation-in-part of our prior application Serial No. 585,410, filed May 17, 1956, now abandoned.

We claim:

1. A composition adaptable for use in the preparation of rations for meat producing cattle consisting essentially of polyethylene glycol and about 30–70 percent by weight of diethylstilbestrol, said polyethylene glycol being liquid and completely soluble in water at room temperature.

2. A composition adaptable for use in the preparation of rations for meat producing cattle consisting of about 50 percent by weight of polyethylene glycol 200 and about 50 percent by weight of diethylstilbestrol.

3. A composition consisting essentially of liquid polyethylene glycol, diethylstilbestrol and acidulated fatty oil containing about 1–5 percent by weight of free fatty acids.

4. A composition consisting essentially of a mixture of liquid polyethylene glycol containing about 30–70 percent by weight of diethylstilbestrol dissolved in acidulated coconut oil containing about 1–3 percent by weight of free fatty acids, the ratio of the polyethylene glycol-diethylstilbestrol mixture being about 1 kilogram to 20–100 liters of coconut oil.

5. A composition consisting essentially of a mixture made up of about equal amounts by weight of polyethylene glycol 200 and diethylstilbestrol dissolved in acidulated coconut oil containing about 2 percent by weight of free fatty acids, the ratio of the polyethylene glycol-diethylstilbestrol mixture being about 1 kilogram to 35–45 liters of coconut oil.

6. A composition in accordance with claim 5 containing about 10–15 grams of diethylstilbestrol per liter.

7. An aqueous emulsion containing dispersed therein a mixture consisting essentially of liquid polyethylene glycol, diethylstilbestrol and acidulated fatty oil containing about 1–5 percent by weight of free fatty acids.

8. An aqueous-fat emulsion made up with a water to fat ratio by weight of about 2–3 to 1 and with about 1–2 percent caustic soda based on the fat, said emulsion containing a mixture dispersed therein made up of liquid polyethylene glycol and diethylstilbestrol dissolved in acidulated coconut oil containing 1–3 percent free fatty acid, the polyethylene glycol being present in a ratio of about 30–70 percent by weight of the diethylstilbestrol, the polyethylene glycol-diethylstilbestrol being present in a ratio of about 1 kilogram to 20–100 liters of coconut oil, and the diethylstilbestrol being present in a ratio of about 25 grams to 1100–1500 pounds of fat.

9. A mixture of cattle feed rations and the emulsion of claim 8.

10. An aqueous-fat emulsion made up of a water to fat ratio by weight of about 2.5 to 1 and with about 1.5 percent caustic soda based on the fat, said emulsion containing a mixture dispersed therein made up of polyethylene glycol 200 and diethylstilbestrol dissolved in acidulated coconut oil containing about 2 percent free fatty acid, the polyethylene glycol and diethylstilbestrol being present in a ratio of about 1 to 1, the polyethylene glycol-diethylstilbestrol mixture being present in a ratio of about 1 kilogram to 25–45 liters of acidulated coconut oil, and the diethylstilbestrol being present in a ratio of about 26 grams to about 1300 pounds of fat.

11. A mixture of cattle feed rations and the emulsion of claim 9.

12. The method which comprises mixing liquid polyethylene glycol with sufficient diethylstilbestrol to provide a mixture containing 30–70 percent by weight of diethylstilbestrol, and then dissolving the resulting mixture in acidulated fatty oil containing about 1–5 percent by weight of free fatty acids.

13. The method of preparing a composition adaptable for spraying on cattle feed rations which comprises emulsifying the composition of claim 12 in an aqueous-fat mixture.

14. The method which comprises mixing polyethylene glycol 200 with about an equivalent amount by weight of diethylstilbestrol, and then dissolving the resulting mixture in acidulated coconut oil containing 1–3 percent by weight of free fatty acids, the ratio of ingredients being about 1 kilogram of polyethylene glycol-diethylstilbestrol to 35–45 liters of acidulated coconut oil.

15. An aqueous-fat emulsion containing dispersed therein a mixture comprising essentially liquid polyethylene glycol, diethylstilbestrol and acidulated coconut oil foots containing about 1–3 percent by weight of free fatty acid.

16. An aqueous-molasses emulsion containing dispersed therein a mixture comprising essentially liquid polyethylene glycol, diethylstilbestrol and acidulated coconut oil foots containing about 1–3 percent by weight of free fatty acid.

17. An aqueous-sugar beet molasses emulsion containing a mixture dispersed therein made up of polyethylene glycol 200 and diethylstilbestrol dissolved in acidulated coconut oil containing about 1–3 percent free fatty acid, said emulsion containing about 10 mg. of diethylstilbestrol per pound.

18. A mixture of cattle feed rations and the molasses emulsion of claim 17.

References Cited in the file of this patent

UNITED STATES PATENTS

| | | |
|---|---|---|
| 2,734,482 | Seltzer | Feb. 14, 1956 |
| 2,855,341 | Meier et al. | Oct. 7, 1958 |
| 2,881,112 | Mattox | Apr. 7, 1959 |

OTHER REFERENCES

Friedman: Jour. Laboratory & Clinical Medicine, May 1944, pages 530–531.

Perloff: Jour. Obst. Gynec. January 1950, vol. 59:1, pages 223–225.